United States Patent
Hann et al.

(10) Patent No.: US 7,995,623 B2
(45) Date of Patent: Aug. 9, 2011

(54) METHOD AND SYSTEM FOR SYNCHRONIZING CLOCK SIGNALS

(75) Inventors: Kenneth Hann, Espoo (FI); Heikki Laamanen, Espoo (FI); Mikko Laulainen, Helsinki (FI)

(73) Assignee: Tellabs Oy, Espoo (FI)

( * ) Notice: Subject to any disclaimer, the term of this patent is extended or adjusted under 35 U.S.C. 154(b) by 392 days.

(21) Appl. No.: 11/949,845

(22) Filed: Dec. 4, 2007

(65) Prior Publication Data
US 2008/0130690 A1    Jun. 5, 2008

(30) Foreign Application Priority Data

Dec. 4, 2006 (FI) .................................... 20061068

(51) Int. Cl.
*H04J 3/06* (2006.01)
*H04L 7/00* (2006.01)
(52) U.S. Cl. ......... 370/507; 370/516; 375/354; 375/371
(58) Field of Classification Search .................. 370/503, 370/507, 508, 516–519; 375/354, 356, 359, 375/362, 229, 232, 371, 375, 376
See application file for complete search history.

(56) References Cited

U.S. PATENT DOCUMENTS

| | | | |
|---|---|---|---|
| 3,597,552 A | 8/1971 | Goto | |
| 6,104,729 A * | 8/2000 | Hellum et al. | 370/503 |
| 6,111,896 A * | 8/2000 | Slattery et al. | 370/535 |
| 6,195,368 B1 * | 2/2001 | Gratacap | 370/535 |
| 6,246,701 B1 * | 6/2001 | Slattery | 370/503 |
| 6,292,490 B1 * | 9/2001 | Gratacap et al. | 370/412 |
| 7,193,976 B2 * | 3/2007 | Chun | 370/311 |
| 2002/0186681 A1 | 12/2002 | Martin | |
| 2003/0035444 A1 | 2/2003 | Zwack | |
| 2004/0264477 A1 | 12/2004 | Repko et al. | |

FOREIGN PATENT DOCUMENTS

| | | |
|---|---|---|
| EP | 1294116 | 3/2003 |
| WO | WO 2004/036341 | 4/2004 |
| WO | WO 2005/077063 | 8/2005 |

OTHER PUBLICATIONS

EP Office Action dated Nov. 23, 2010 from corresponding EP07121473.

* cited by examiner

*Primary Examiner* — Aung S Moe
*Assistant Examiner* — Kerri M Rose
(74) *Attorney, Agent, or Firm* — Young & Thompson

(57) ABSTRACT

A method and system for adjusting a clock signal in a network element of a data network adjusts the clock signal based on difference values formed by received synchronizing messages. Each difference value is a difference of a reception and transmission values of a received synchronizing message. The reception value depends on a cumulated number of periods of the clock signal at a moment of arrival of the synchronizing message. The transmission value depends on a position of the synchronizing message in a chronological transmission order of synchronizing messages. When adjusting, an adjusting effect of the difference values belonging to a lower part of a margin of fluctuation of the difference values is weighted more heavily than that of an upper part. Thus, for clock signal adjustment, that share of information represented by the received synchronizing messages that has the least interference is used, irrespective of the data network load.

33 Claims, 4 Drawing Sheets

METHOD AND SYSTEM FOR SYNCHRONIZING CLOCK SIGNALS

FIELD OF THE INVENTION

The invention relates to a method and system for mutually synchronizing a clock signal placed in the network element of a data network, and a clock signal placed in the network element of another data network.

BACKGROUND OF THE INVENTION

In many data networks, there is a need to synchronize the clock signals of the network elements, so that the ratio of frequencies of the clock signals placed in two or more separate network elements is constant, as accurately as possible. Often the momentary steps of different clock signals are attempted to be kept equally large as accurately as possible. Said network elements can be for example routers or base stations of mobile phone networks. The synchronizing of clock signals is often based on that the network elements to be mutually synchronized transmit to each other synchronizing messages, on the basis of which each network element adjusts the operation frequency and/or phases of operation of its own clockwork. In many data networks, there is a remarkable random-type element in the transmission delays between the network elements, which random-type element complicates the adjusting process based on synchronizing messages and weakens the quality of the mutual synchronizing between the clock signals. Said random-type element is caused, among others, by random-type queuing delays experienced by the data to be transmitted in the transmission buffers and/or reception buffers of the network elements. The random-type nature of a transmission delay is strong particularly in packet, frame and cell switched data networks.

PRIOR ART

In the publications EP 1455473 A2 and WO 2005/020486 A1 there is introduced an arrangement where a clock signal is adjusted only on the basis of the information represented by the synchronizing messages that have experienced the shortest detected transmission delay. Each synchronizing message that has experienced the shortest detected transmission delay is selected from among the synchronizing messages received during an observation period with a predetermined length. When a data network is only lightly loaded, the synchronizing messages that have experienced the shortest detected transmission delay have not needed to queue for any remarkable length in the transmission buffers and/or reception buffers of the network elements. In other words, said transmission buffers and/or reception buffers have been empty or nearly empty, when the synchronizing messages that have experienced the shortest detected transmission delay have arrived in said buffers. Consequently, this arrangement can be used for alleviating the effects of random-type queuing delays on the adjustment of a clock signal. The more heavily the data network is loaded, the rarer are situations where the transmission buffers and/or reception buffers of a network element are empty or nearly empty. When the loading of a data network increases, the shortest synchronizing message transmission delay that occurs during an observation period with a constant length all the more rarely represents a transmission delay that does not contain a random-type queuing delay. The random-type element of a transmission delay complicates the operation of an adjustment process based on synchronizing messages and weakens the quality of the mutual synchronizing between clock signals. The share of the random-type element in the shortest transmission delay occurring during the observation period can be decreased by extending the chronological length of the observation period. On the other hand, a chronological extension of the observation period also extends the chronological interval between successive adjusting measures, which complicates the adjusting process based on synchronizing messages and weakens the quality of the mutual synchronizing between clock signals.

The publication WO 2005/077063 A2 introduces an arrangement where the adjusting effect of the information represented by a synchronizing message is attempted to be weighted according to how near the transmission delay experienced by said synchronizing message is to the transmission delay average value, type value, median value or low-pass filtered value. This means that the arrangement alleviates the effects of the extremes of the transmission delay distribution on the adjustment of a clock signal. In certain situations, a method according to this arrangement leads to a better quality in the mutual synchronizing between clock signals than a conventional method based on averaging or low-pass filtering. As regards the practical implementation of the method, a challenge is brought about by the effect of low-frequency components on the average value, type value, median value and low-pass filtered value of the transmission delay.

SUMMARY OF THE INVENTION

The invention relates to a system for mutually synchronizing a first clock signal placed in a first network element and a second clock signal placed in a second network element. Said first network element is arranged to transmit synchronizing messages to said second network element, and said second network element is arranged to receive said synchronizing messages. The system according to the invention includes:
  a calculation means that is arranged to establish a synchronizing message difference value that is essentially the same as the difference of the reception time value and transmission value of said synchronizing message, said reception time value being dependent on the cumulated number of periods of said second clock signal at the moment of arrival of said synchronizing message at a predetermined synchronizing point in said second network element, and said transmission value being dependent on the position of said synchronizing message in the chronological transmission order of the synchronizing messages, and
  an adjusting means that is arranged to adjust said second clock signal on the basis of the information contained by difference values corresponding to chronologically successive synchronizing messages.

A system according to the invention is characterized in that said adjusting means is arranged to weight the adjusting effect of the difference values belonging to the first area in the margin of fluctuation of the difference values more heavily than the adjusting effect of the difference values belonging to the second area of the margin of fluctuation of the difference values, said first area representing smaller difference values than said second area.

The invention also relates to a network element that is arranged to receive synchronizing messages and that includes:
  a calculation means that is arranged to form a difference value of a received synchronizing message, which difference value is essentially the same as the difference of the reception time value and the transmission value of said synchronizing message, said reception time value being dependent on the cumulated number of periods of the clock signal placed in said network element at the moment of arrival of said synchronizing message at a predetermined synchronizing point in said network element and said transmission value being dependent on the position of said synchronizing message in the chronological transmission order of the synchronizing messages, and an adjusting means that is arranged to adjust said clock signal on the basis of the information contained by difference values corresponding to chronologically successive synchronizing messages.

A network element according to the invention is characterized in that said adjusting means is arranged to weight the adjusting effect of the difference values belonging to the first area of the margin of fluctuation of the difference values more heavily than the adjusting effect of the difference values belonging to the second area of the margin of fluctuation of said difference values, said first area representing smaller difference values than said second area.

The invention also relates to a method for mutually synchronizing a first clock signal placed in a first network element and a second clock signal placed in a second network element, in which method:

synchronizing messages are transmitted from said first network element to said second network element, said synchronizing messages are received in said second network element, for each synchronizing message, there is established a difference value that is essentially the same as the difference of the reception time value and the transmission value of said synchronizing message, said reception time value being dependent on the cumulated number of periods of the clock signal placed in said network element at the moment of arrival of said synchronizing message at a predetermined synchronizing point in said network element, and said transmission value being dependent on the position of said synchronizing message in the chronological transmission order of the synchronizing messages, and said second clock signal is adjusted on the basis of the information contained by difference values corresponding to chronologically successive synchronizing messages.

A method according to the invention is characterized in that while adjusting the second clock signal, the adjusting effect of the difference values belonging to the first area of the margin of fluctuation of the difference values is weighted more heavily than the adjusting effect of the difference values belonging to the second area of the margin of fluctuation of said difference values, said first area representing smaller difference values than said second area.

The invention also relates to a computer program for controlling a programmable processing unit in order to adjust a clock signal placed in a network element on the basis of the information contained by difference values corresponding to chronologically successive synchronizing messages. Each difference value is essentially the same as the difference of the reception time value and the transmission value of the received synchronizing message. Said reception time value depends on the cumulated number of periods of said clock signal at the moment of receiving said synchronizing message at a predetermined synchronizing point in said network element, and said transmission value depends on the position of said received synchronizing message in the chronological transmission order of the synchronizing messages.

A computer program according to the invention is characterized in that the computer program is provided with programwise means for guiding said programmable processing unit to weight the adjusting effect of the difference values belonging to the first area of the margin of fluctuation of the difference values more heavily than the adjusting effect of the difference values belonging to the second area of the margin of fluctuation of said difference values, said first area representing smaller difference values than said second area.

By means of the embodiments of the invention, there is achieved a remarkable advantage in that while adjusting a clock signal, there can be used the least interfered part of the information representing the received synchronizing messages, irrespective of the loading situation of the data network.

The various embodiments of the invention are characterized by what is set forth in the dependent claims.

BRIEF DESCRIPTION OF THE DRAWINGS

The embodiments and advantages of the invention are explained in more detail below, with reference to the embodiments described by way of example, and to the appended drawings, where.

DETAILED DESCRIPTION OF PREFERRED EMBODIMENTS

Figure 1:
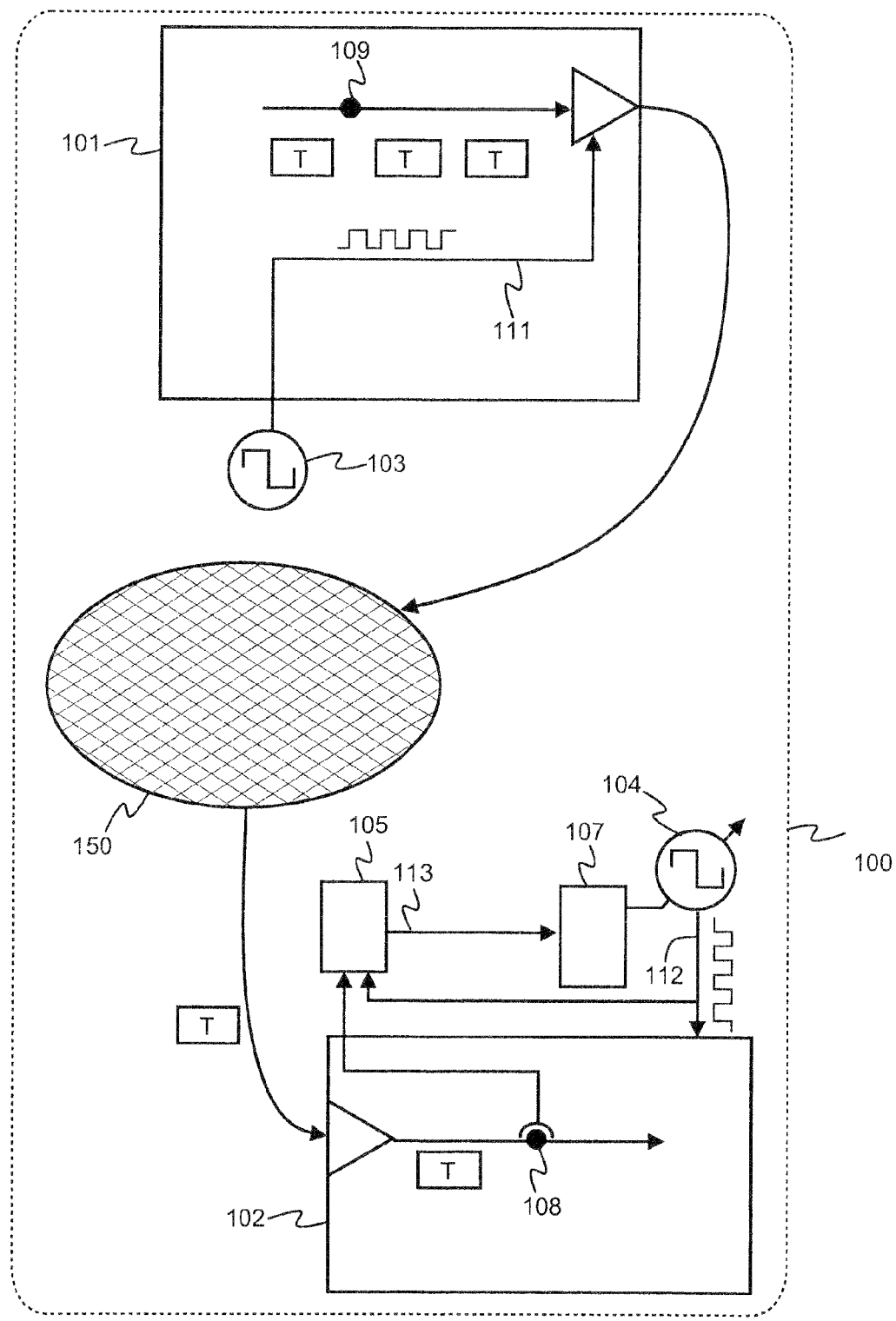
FIG. 1 illustrates a system according to an embodiment of the invention for mutually synchronizing a clock signal placed in a network element and a second clock signal placed in another network element.

FIG. 1 illustrates a system according to an embodiment of the invention for mutually synchronizing a first clock signal 111 placed in a first network element 101 and a second clock signal 112 placed in a second network element 102 in a data network 100. Apart from said network elements 101 and 102, other elements of the data network 100 are represented by a cross-hatched ellipse 150. The clock signal 111 is generated by an oscillator 103. The clock signal 112 is generated by an adjustable oscillator 104, which can be for example a numerically controlled oscillator NCO. The network element 101 is arranged to transmit synchronizing messages T to the network element 102, and the network element 102 is arranged to receive said synchronizing messages T.

The system includes a calculation means 105, which is arranged to calculate the difference value 113 of the synchronizing message T, said difference value 113 being essentially the same as the difference of the reception time value and transmission value of said synchronizing message. Said reception time value depends on the cumulated number of periods of the clock signal 112 at the moment of arrival of said synchronizing message at a predetermined synchronizing point 108 in the network element 102. Said cumulated number of periods can be calculated for example by a calculator that is arranged to calculate the periods of the clock signal 112. Consequently, said cumulated number of periods corresponds to the moment of time data, i.e. to the clock time according to the clock signal 112. Said transmission value depends on the position of said synchronizing message in the chronological transmission order of the synchronizing messages. The synchronizing point 108 can be for instance an inlet port of a network element 102, in which case said reception time value corresponds to the moment of arrival of the synchronizing message in the network element 102.

The system includes an adjusting means 107, which is arranged to adjust the clock signal 112 on the basis of the information contained by difference values 113 corresponding to chronologically successive synchronizing messages. The adjusting means 107 is arranged to weight the adjusting effect of the difference values 113 belonging to the first area of the margin of fluctuation of the difference values more heavily than the adjusting effect of the difference values belonging to the second area of said margin of fluctuation of the difference values. Said first area of the margin of fluctuation represents lower difference values than said second area of the margin of fluctuation.

In a system according to a preferred embodiment of the invention, a network element 101 is arranged to transmit a first synchronizing message, to wait for a preset expected number of periods of the clock signal 111 and to transmit a second synchronizing message. A network element 102 is arranged to update the calculator value by a predetermined change value as a response to receiving said second synchronizing message. The calculation means 105 is arranged to use said calculator value as a transmission value connected to said synchronizing message.

Said calculator value can be interpreted as the kind of information, the formation of which is based on previously known data. Said previously known data can for example express that the difference of the transmission times of chronologically successive synchronizing messages is constant. In case in the network element 102 there is only known that the difference of the transmission times of chronologically successive synchronizing messages is constant, the clock signal 112 can be adjusted so that the ratio of the frequencies of the clock signals 112 and 111 remains constant as accurately as possible. Said constant value is not, however, known in the network element 102. In case in the network element 102 there also is known the number of the waiting periods of the clock signal 111 between chronologically successive synchronizing messages, the clock signal 112 can be adjusted so that the ratio of the frequencies of the clock signals 112 and 111 remains as accurately as possible at a preset constant value, which is essentially the ratio of the calculator change value and the number of the waiting periods of the clock signal 111. In a system according to a preferred embodiment of the invention said ratio is one.

In a system according to a preferred embodiment of the invention, the network element 101 is arranged to write in each synchronizing message a serial number or other data indicating the transmission order of the synchronizing messages. Thus the network element 102 is better able to control situations, where the transmitted synchronizing message does not reach the network element 102, or where the arrival order of the synchronizing messages in the network element 102 is not the same as the transmission order of said synchronizing messages from the network element 101. Reversions in the order can happen for instance in a packet-switched data network without connections.

In a system according to a preferred embodiment of the invention, the network element 101 is arranged to write in the synchronizing message a time stamp, which depends on the number of cumulated periods of the clock signal 111, which corresponds to the departure time of said synchronizing message from a predetermined synchronizing point 109 of the network element 101. The network element 102 is arranged to read said time stamp from said synchronizing message. The calculation means 105 is arranged to use said time stamp as a transmission value connected to said synchronizing message. The network element 102 can also use said time stamp as data indicating the transmission order of the synchronizing messages.

In order to illustrate the operation of the system illustrated in FIG. 1, let us observe an exemplary situation, where the synchronizing messages $T_k$ (k=0, 1, 2, ...) are transmitted from the network element 101 at the moments of time:

$$ts_k = t_0 + \sum_{j=1}^{k} V_j \qquad (1)$$

where $V_j$ is the difference (j=1, 2, ..., k) of the transmission times of the synchronizing messages $T_{j-1}$ and $T_j$. In said exemplary situation, the transmission delay D experienced by the synchronizing message $T_k$ from the network element 101 to the synchronizing point 108 of the network element 102 is $D_k$. In this case the synchronizing message $T_k$ arrives at the synchronizing point 108 at the moment of time:

$$tr_k = t_0 + D_k + \sum_{j=1}^{k} V_j. \qquad (2)$$

Let us assume that the number of periods cumulated in the clock signal 112 at the moment of arrival of the synchronizing message $T_0$ at the synchronizing point 108 of the network element is $K_0$. Now the number of periods $K_k$ cumulated in the clock signal 112 at the moment of arrival of the synchronizing message $T_k$ in the synchronizing point 108 of the network element 102 is:

$$K_k = K_0 + \sum_{j=1}^{k} (f_{112}^j \times (tr_j - tr_{j-1})) \qquad (3)$$

$$= K_0 + \sum_{j=1}^{k} [f_{112}^j \times (D_j - D_{j-1})] + \sum_{j=1}^{k} (f_{112}^j \times V_j),$$

where $f_{112}^j$ is the average frequency of the clock signal 112 during the interval between the reception of the synchronizing messages $T_{j-1}$ and $T_j$. Let us also assume that the transmission value $S_k$ of the synchronizing message $T_k$ is $$S_k = S_0 + \sum_{j=1}^{k} P_j, \qquad (4)$$

where $P_j$ is the difference of the transmission values of the synchronizing messages $T_{j-1}$ and $T_j$. The transmission value $S_k$ can be formed for example by means of a calculator in the network element 102, in case the network element 102 knows the differences $P_j$ of the transmission values on the basis of a rule known in advance. For instance the network element 101 can transmit the synchronizing messages at constant time slots, in which case Pj is constant with all values of j. On the other hand, $S_k$ can represent the time stamp to be written in the synchronizing message, which time stamp is written in the network element 101 of the synchronizing message $T_k$.

The selected difference value $E_k$ for the synchronizing message $T_k$ can be for example the difference $K_k - S_k$, which is $$E_k = (K_0 - S_0) + \sum_{j=1}^{k} (f_{112}^j \times V_j - P_j) + \sum_{j=1}^{k} [f_{112}^j \times (D_j - D_{j-1})]. \quad (5)$$

For the sake of example, let us now observe a situation where $P_k = A \times V_k \times f_{111}$, where $f_{111}$ is the frequency of the clock signal 111 and A is constant. In case the transmission delay $D_k$ would be the same with all k, the resulting ratios:

$$E_k > E_{k-1} \Rightarrow f^*_{112} > A \times f_{111} \text{ and } E_k < E_{k-1} \Rightarrow f^*_{112} < A \times f_{111} \quad (6)$$

would be valid with all k, where $f^*_{112}$ is the average frequency of the clock signal 112 during the interval between the reception of the synchronizing messages $T_{k-1}$ and $T_k$. In other words, an increase in the difference value E would indicate a need to reduce the frequency $f_{112}$ of the clock signal 112, and respectively a decrease in the difference value E would indicate a need to increase the frequency $f_{112}$ of the clock signal 112. A fluctuation of the transmission delay D complicates the adjusting of the clock signal 112 and weakens the quality of the adjusting process, because the above mentioned resulting ratios are not necessarily valid with all k. The weakening of the adjusting quality is indicated for instance by an increase in the fluctuation of the frequency ratio $f_{112}/f_{111}$.

Figure 2:
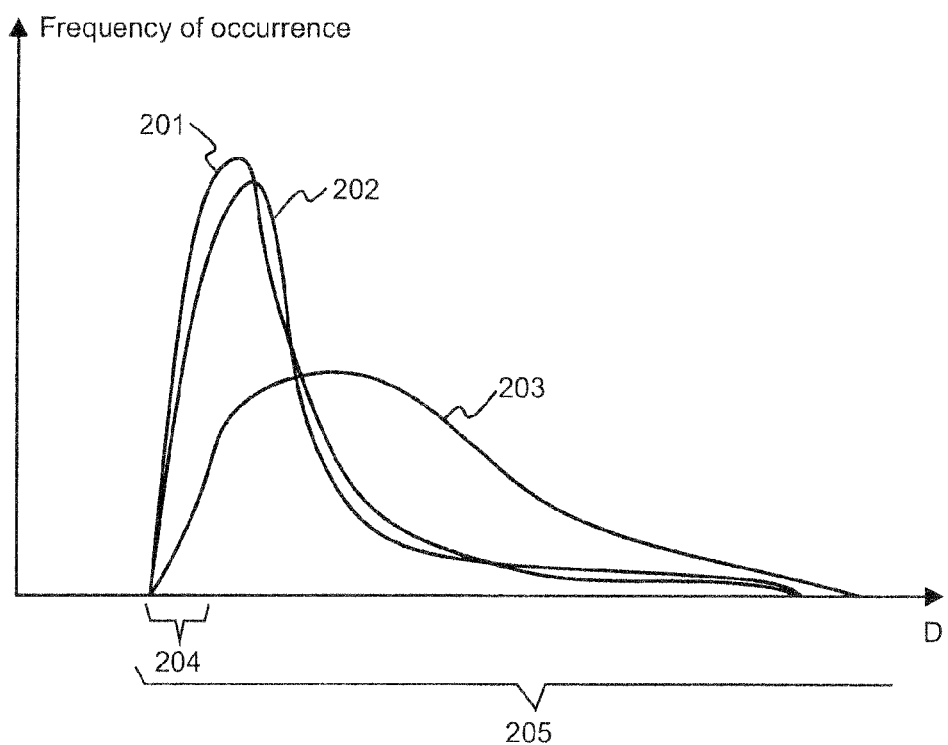
FIG. 2 illustrates transmission delay distributions corresponding to exemplary situations in a system illustrated in FIG. 1.

FIG. 2 illustrates the distributions of the transmission delays D, corresponding to the exemplary situations, in a system illustrated in FIG. 1. The distribution 201 illustrates the distribution of the set of transmission delays JD1=$D_{n1}$, $D_{n1+1}$, ..., $D_{n1+m1}$, where n1 and m1 are integrals. The distribution 202 illustrates the distribution of the set of transmission delays JD2=$D_{n2}$, $D_{n2+1}$, ..., $D_{n2+m2}$, where n2 and m2 are integrals. The sets JD1 and JD2 are assumed to be mutually deviant, but they can contain common elements. In an exemplary situation corresponding to the distributions 201 and 202, the routing topology and load situation of the data network 150 (FIG. 1) is assumed to be unchanged. In this case the distributions 201 and 202 would be mutually similar, if the sets JD1 and JD2 would contain an infinite number of elements. The distribution 203 illustrates the distribution of the set of transmission delays JD3=$D_{n3}$, $D_{n3+1}$, ..., $D_{n3+m3}$, where n3 and m3 are integrals. In an exemplary situation corresponding to the distribution 203, the load of the data network 150 (FIG. 1) is larger than in an exemplary situation corresponding to the distributions 201 and 202.

The distributions 201, 202 and 203 are best mutually resembling at the lower part 204 of the margin of fluctuation 205 of the transmission delay D, because transmission delays representing the lower part 204 of the margin of fluctuation of the transmission delay contain the least amount of random-type queuing delay. In this case for example a moving average of the transmission delay D or a low-pass filtered value, in the formation of which there are weighted transmission delays representing the lower part 204 of the margin of fluctuation of the transmission delay, generally remains better stable than a non-weighted moving average or a low-pass filtered value.

The frequency $f_{112}$ of the clock signal 112 (FIG. 1) is a variable where the relative deviations from the average are very slight, wherefore the equation (5) can at a moderate accuracy be approximated as follows:

$$E_k \approx (K_0 - S_0) + \sum_{j=1}^{k} (f_{112}^j \times V_j - P_j) + f_{112} \times D_k - f_{112} \times D_0. \quad (7)$$

Figure 3:
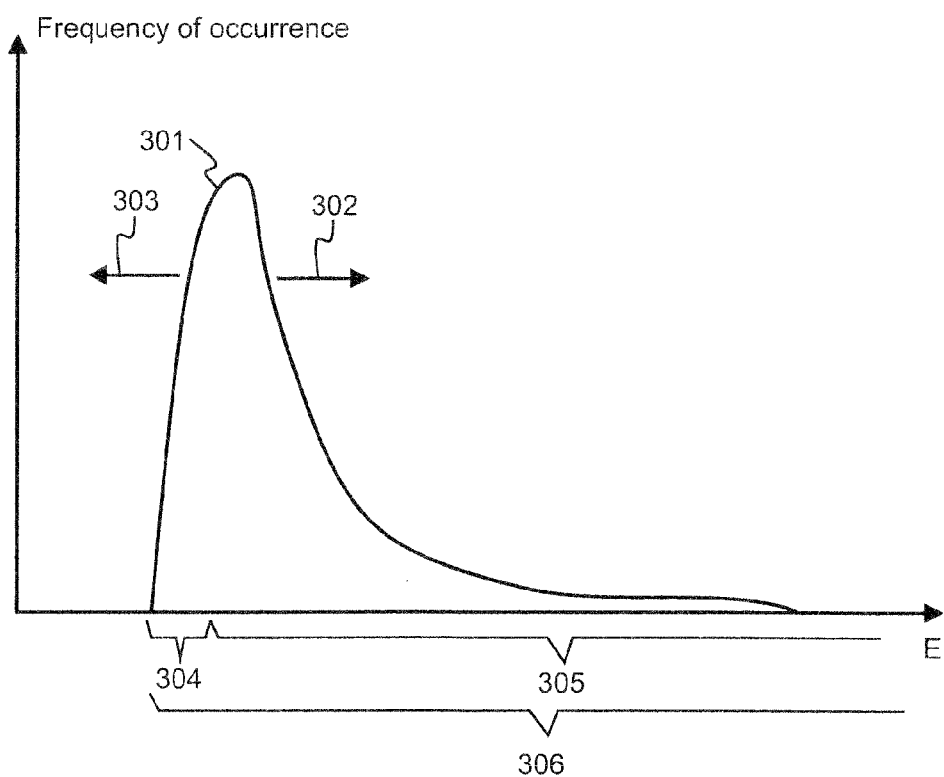
FIG. 3 illustrates the distribution of difference values, formed by means of synchronizing messages, corresponding to an exemplary situation in a system illustrated in FIG. 1.

FIG. 3 illustrates the distribution of the difference values of the synchronizing messages corresponding to an exemplary situation in a system illustrated in FIG. 1. The distribution 301 illustrates the distribution of the set JE=$E_{n4}$, $E_{n4+1}$, ..., $E_{n4+m4}$ of difference values, where n4 and m4 are integrals. In case the clock signal 112 is adjusted so that the sum clause of the equation (7) is essentially constant, the distribution 301 has the same shape as the distribution of the corresponding transmission delays $D_{n4}, D_{n4+1}, ..., D_{n4+m4}$. In case the value of said sum clause increases, the distribution 301 moves in the direction of the arrow 302.

Respectively, in case the value of said sum clause decreases, the distribution 301 moves in the direction of the arrow 303. In practical situations the moving rate of the distribution of the difference values is so low that the distribution of the difference values is essentially of the same shape as the distribution of corresponding transmission delays. In this case for instance the moving average of the difference value E or a low-pass filtered value, in the formation of which there is weighted the lower part 304 of the margin of fluctuation 306 of the difference values, generally remains better stable than a non-weighted moving average or low-pass filtered value.

The adjusting means 107 (FIG. 1) is arranged to weight the adjusting effect of the difference values belonging to the first area 304 of the margin of fluctuation 306 more heavily than the adjusting effect of the difference values belonging to the second area 305 of the margin of fluctuation of said difference values. Said first area 304 of the margin of fluctuation represents smaller difference values than the second area 305 of said margin of fluctuation. Now for adjusting the clock signal 112, there is used that share of the information representing the received synchronizing messages where the interference effect caused by the transmission delay D is slight.

In a system according to a preferred embodiment of the invention, the adjusting means 107 (FIG. 1) is arranged to define the limit value R, below which there is left a predetermined share of the difference values E. Said limit value can be used as a limit between the areas 304 and 305 (FIG. 3) of the margin of fluctuation 306 of the difference values.

In a system according to a preferred embodiment of the invention, the adjusting means 107 (FIG. 1) is arranged to define said limit value R and to update said limit value R according to the following algorithm:

V1: said predetermined share is indicated by means of a number p (<1),
V2: an initial value $R_0$ is set for said limit value R,
V3: the system waits until obtaining the next difference value,
V4: the limit value is updated according to the rule $R=R_{old}+p\epsilon$, if the difference value $E>R_{old}$, or according to the rule $R_{old}-(1-p)\epsilon$, if the difference value $E<R_{old}$,
V5: step V3 is resumed.

In order to illustrate the above described algorithm, it is assumed that the difference value E remains below the limit value R with a probability r, and surpasses the limit value R with a probability 1−r. Now the expected magnitude of the updated limit value is $$R+[(1-r)p-r(1-p)]\epsilon = R+(p-r)\epsilon. \quad (8)$$

From the equation (8) it can be seen that the limit value R decreases, if too large a share of the difference values falls below the limit value R (r>p). Respectively the limit value R increases, if too small a share of the difference values falls below the limit value R (r<p). The rate of change of the limit value can be adjusted by means of a change step E. A suitable value for the change step $\epsilon$ can be found for example by experimenting.

In a system according to a preferred embodiment of the invention, the adjusting means 107 (FIG. 1) is arranged to adjust the difference value of the clock signal 112 on the basis of a chronological change according to the following equation:

$$f^k{}_{112} = f^{k-1}{}_{112} - (E_k - E_{k-1})\delta\alpha_k, \quad (9)$$

which is based on the resulting ratios (6).

In the equation (9), the coefficient $\alpha_k = C_1$, if $E_k < R$ and $E_{k-1} < R$, and $\alpha k = C_2 < C_1$, if $E_k > R$ or $E_{k-1} > R$. The coefficient $\delta$ is an adjusting step, by means of which the amplification of the adjusting process can be arranged. Fluctuation in the transmission delay D is in the adjusting of the clock signal 112 expressed as disturbing noise, the interfering effect of which can be alleviated by using a sufficiently small adjusting step $\delta$.

In a system according to a preferred embodiment of the invention, the coefficient $C_2 = 0$. Now the adjusting means 107 is arranged to adjust the clock signal 112 only on the basis of the adjusting effect of difference values that are smaller than the limit value R.

In a system according to a preferred embodiment of the invention, the adjusting means 107 (FIG. 1) is arranged to form a weighted moving average of the difference values, where the weighting coefficients of the difference values that fall below the limit value R are larger than the weighting coefficients of the difference values that surpass said limit value R, and to adjust the clock signal 112 on the basis of said weighted moving average.

Said weighted moving average $PLK_k$ (k=N, N+1, . . . ) can be formed for instance according to the following equation:

$$PLK_k = \frac{\alpha_{k-N}E_{k-N} + \alpha_{k-N+1}E_{k-N+1} + \ldots + \alpha_k E_k}{\alpha_{k-N} + \alpha_{k-N+1} + \ldots + \alpha_k}, \quad (10)$$

where the coefficient $\alpha_j = C_1$, if $E_j < R$, and $\alpha_j = C_2 < C_1$, if $E_j > R$, j=k−N, . . . , k.

In a system according to a preferred embodiment of the invention, the weight coefficient of the weighted moving average is zero, $C_2 = 0$. Now the adjusting means 107 is arranged to adjust the clock signal 112 only on the basis of adjusting effect of difference values that are smaller than the limit value R.

In a system according to a preferred embodiment of the invention, the adjusting means 107 (FIG. 1) includes a low-pass filter that is arranged to form a low-pass filtered value of the difference values, where the weighting coefficients of difference values that fall below the limit value R are larger than the weighting coefficients of difference values that surpass said limit value R, and the adjusting means 107 is arranged to adjust the clock signal 112 on the basis of said low-pass filtered value.

Said low-pass filtered value $LPF_k$ (k=1, 2, . . . ) can be updated for example according to the following equation:

$$LPF_k = LPF_{k-1} + \alpha_k(E_k - LPF_{k-1}), \quad (11)$$

where the coefficient $\alpha_k = C_1$, if $E_k < R$, and $\alpha_k = C_2 < C_1$, if $E_k > R$.

In a system according to a preferred embodiment of the invention, the weighting coefficient of the low-pass filtering is zero, $C_2 = 0$. Now the adjusting means 107 is arranged to adjust the clock signal 112 only on the basis of the adjusting effect of difference values smaller than the limit value R.

In a system according to a preferred embodiment of the invention, the adjusting means 107 is arranged to define an estimate of the distribution of the difference values by classifying said difference values in value slots $H_n$ (n=1, 2, . . . , M) with predetermined low and high limits $Ha_n$ and $Ha_{n+1}$, and by forming for each value slot a frequency of occurrence indicator $F_n$, which is proportional to the number of the difference values belonging to said value slot.

In a system according to a preferred embodiment of the invention, the adjusting means 107 (FIG. 1) is arranged to define the distribution estimate of the difference values and to update said distribution estimate of the difference values according to the following algorithm:

V1: set $F_n = 0$ with all n=1, . . . , M and set Sum=0,

V2: wait until the next difference value E is obtained,

V3: search the value slot $H_k$, for which $Ha_k < E < Ha_{k+1}$,

V4: update $F_k = F_{k,\,old} + 1$ and Sum=$Sum_{old} + 1$,

V5: if Sum>preset number N, update $F_n = N \times F_{n,\,old}/(N+1)$ for all n=1, . . . , M and set Sum=N, V6: return to step V2.

In a system according to a preferred embodiment of the invention, the adjusting means 107 is arranged to define the value slots $H_n$ (n=1, 2, . . . , L) representing the lower part of the margin of fluctuation of the difference values, the sum $S_L$ of the frequency of occurrence indicators $F_n$ of said value slots being a preset share p (<1) of the sum N of the frequency of occurrence indicators of all value slots $H_n$ (n=1, 2, . . . , M). The value slots $H_n$ (n=1, 2, . . . , L) representing the lower part of the margin of fluctuation of the difference values can be selected for instance as follows:

$$S_L = \sum_{n=1}^{L} F_n \le pN \text{ and } S_L + F_{L+1} = \sum_{n=1}^{L+1} F_n > pN \quad (12)$$

The adjusting means 107 is arranged to calculate from the estimate of the distribution of the difference values a weighted expected value, where the weighting coefficients of the frequency of occurrence indicators $F_n$ of those value slots $H_n$ (n=1, 2, . . . , L) that represent the lower part of the margin of fluctuation of the difference values are larger than the weighting coefficients of the frequency of occurrence indicators of other value slots, and to adjust the clock signal 112 on the basis of said weighted expected value.

Said weighted expected value $POA_k$ (k=0, 1, . . . ) can be formed for instance according to the following equation:

$$POA_k = \frac{\sum_{n=1}^{M}\left(\alpha_n F_n \times \frac{Ha_n + Ha_{n+1}}{2}\right)}{\sum_{n=1}^{M}\alpha_n}, \quad (13)$$

where the weighting coefficient $\alpha_n$ of the frequency of occurrence indicator=$C_1$, if n≦L, and $\alpha_n$=$C_2$<$C_1$, if n>L.

In a system according to a preferred embodiment of the invention, the weighting coefficient $C_2$ used in the calculation of the weighted expected value $POA_k$=0. Now the adjusting means 107 is arranged to adjust the clock signal 112 only on the basis of the adjusting effect of the difference values belonging to the interval $Ha_1 \ldots Ha_{L+1}$.

Figure 4:
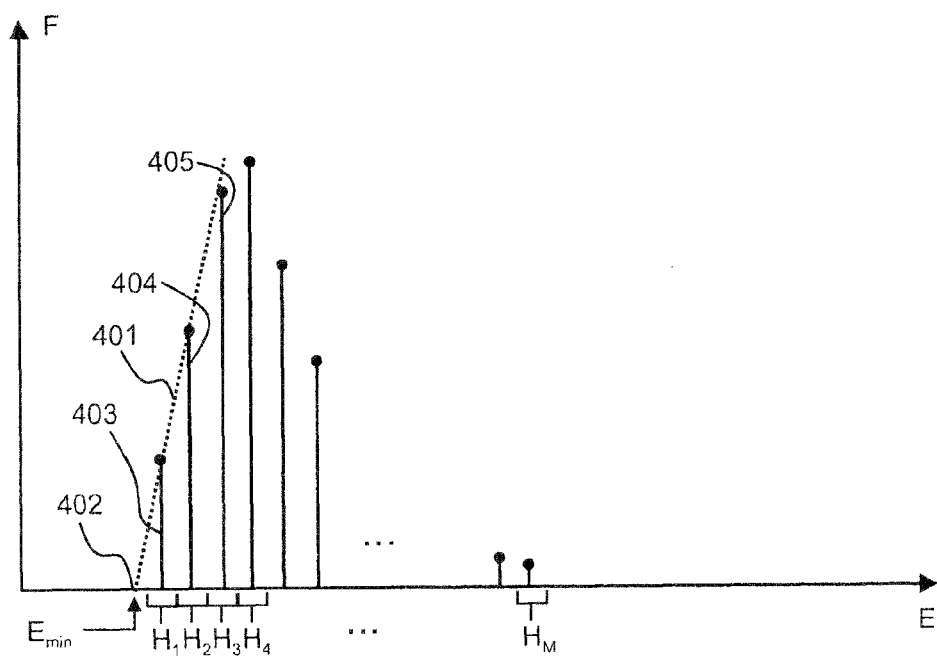
FIG. 4 illustrates the defining of a minimum difference value estimate from an estimate of the difference value distribution by fitting a curve in a system according to an embodiment of the invention.

In a system according to a preferred embodiment of the invention, the adjusting means 107 is arranged to form an estimate $E_{min}$ of the minimum difference value and to adjust the clock signal 112 on the basis of said estimate of the minimum difference value. The estimate of the minimum difference value can be defined for example according to the principle illustrated in FIG. 4. With the frequency of occurrence indicators 403, 404 and 405 that are connected to the lower part of the margin of fluctuation of the difference values, there is fitted the curve 401. The difference value corresponding to the zero point 402 of the curve 401 represents said estimate $E_{min}$ of the minimum difference value. The curve 401 can be for instance a polynome that can be fitted with the values of the frequency of occurrence indicators, for example according to the shortest square sum method.

A weighted moving average according to equation 10, a low-pass filtered value according to equation 11 or a weighted expected value according to equation 13 can be used for instance as the input value the loop filter of a phase-locked loop that is arranged to adjust the frequency of the clock signal 112.

The calculation means 105 and the adjusting means 107 illustrated in FIG. 1 can be realized for instance by one or several programmable processors, application specific integrated circuits ASIC, field programmable gate arrays FPGA and/or memory circuits.

Figure 5:
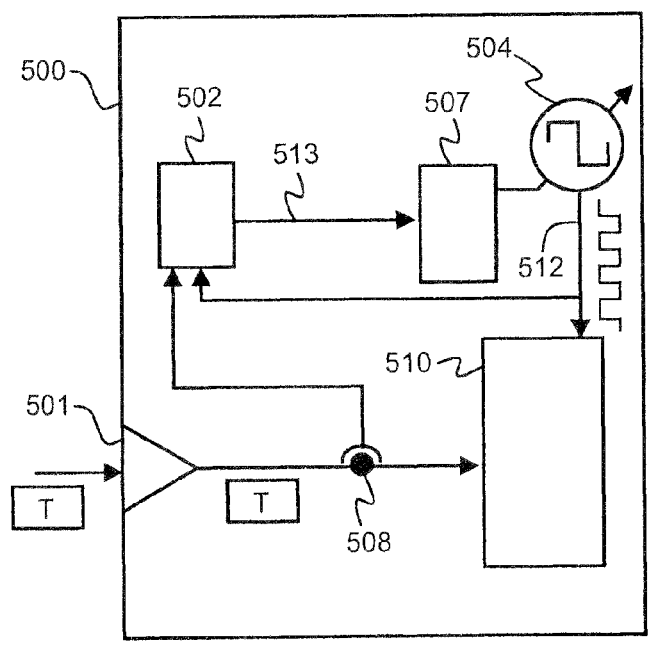
FIG. 5 illustrates a network element according to an embodiment of the invention.

FIG. 5 illustrates a network element 500 according to an embodiment of the invention. The network element includes a reception port 501, whereby the network element is arranged to receive synchronizing messages T. The network element is provided with calculation means 502 that is arranged to form the difference value 513 of the received synchronizing message, which is essentially the difference of the reception time value and the transmission value of said synchronizing message. Said reception time value depends on the cumulated number of periods of said clock signal 512 placed in the network element at the moment of arrival of said synchronizing message at a predetermined synchronizing point 508 in the network element. Said transmission value depends on the position of said synchronizing message in the chronological transmission order of the synchronizing messages. The network element comprises adjusting means 507 that is arranged to adjust the clock signal 512 on the basis of the information contained by difference values corresponding to chronologically successive synchronizing messages. The adjusting means 507 is arranged to weight the adjusting effect of the difference values belonging to the first area of the margin of fluctuation of said difference values more heavily than the adjusting effect of the difference values belonging to the second area of the margin of fluctuation of the difference values. The first area of said margin of fluctuation represents smaller difference values than said second area of the margin of fluctuation. The clock signal 512 is generated by an adjustable oscillator 504, which can be for instance a numerically controlled oscillator NCO.

A network element according to a preferred embodiment of the invention is arranged to read the time stamp from the received synchronizing message, and the calculation means 502 is arranged to use said time stamp as the transmission value connected to said synchronizing message.

A network element according to a preferred embodiment of the invention is arranged to update the calculator value by a predetermined number as a response to receiving a synchronizing message, and the calculation means 502 is arranged to use said calculator value as the transmission value connected to said synchronizing message.

In a network element according to a preferred embodiment of the invention, the adjusting means 507 is arranged to define a limit value that is not surpassed by a predetermined share of difference values. The adjusting means is arranged to form a weighted moving average of the difference values, where the weighting coefficients of the difference values that fall below said limit value are larger than the weighting coefficients of the difference values that surpass said limit value, and to adjust the clock signal 512 on the basis of said weighted moving average.

In a network element according to a preferred embodiment of the invention, the adjusting means 507 is arranged to define a limit value that is not surpassed by a predetermined share of difference values. The network element 500 includes a low-pass filter that is arranged to form a low-pass filtered value of said difference values, where the weighting coefficients of the difference values falling below said limit value are larger than the weighting coefficients of the difference values surpassing said limit value. The adjusting means 507 is arranged to adjust the clock signal 512 on the basis of said low-pass filtered value.

In a network element according to a preferred embodiment of the invention, the adjusting means 507 is arranged to define an estimate of the distribution of the difference values by classifying the difference values in value slots with predetermined low and high limits, and by forming for each value slot a frequency of occurrence indicator that is proportional to the number of the difference values belonging to said value slot. In addition, the adjusting means 507 is arranged to define the value slots that represent the lower part of said margin of fluctuation of the difference values, the sum of the frequency of occurrence indicators of said difference values being a preset share of the sum of the frequency of occurrence indicators of all value slots. Moreover, the adjusting means 507 is arranged to calculate from said estimate of the distribution of the difference values a weighted expected value, where the weighting coefficients of the frequency of occurrence indicators of those value slots that represent the lower part of the margin of fluctuation of said difference values are larger than the weighting coefficients of the frequency of occurrence indicators of other value slots. The adjusting means 507 also is arranged to adjust the clock signal 512 on the basis of said weighted expected value.

In a network element according to a preferred embodiment of the invention, the adjusting means 507 is arranged to define the estimate of the distribution of the difference values by classifying said difference values in value slots that have predetermined low and high limits, and by forming for each value slot a frequency of occurrence indicator that is proportional to the number of the difference values belonging to said value slot. The adjusting means 507 is arranged to fit the curve with the frequency of occurrence indicators of the value slots representing said lower part of the margin of fluctuation of the difference values and to adjust the clock signal 512 on the basis of the difference value corresponding to the zero point of said curve.

The network element illustrated in FIG. 5 can be for example an IP (Internet Protocol) router, an ATM (Asynchronous Transfer Protocol) switch, an MPLS (Multi Protocol Label Switching) switch or an Ethernet switch, and it can serve for instance as a mobile phone base station.

The block 510 illustrated in FIG. 5 represents such parts in the network element that are not significant with respect to the present invention.

The calculation means 502 and the adjusting means 507 illustrated in FIG. 5 can be realized for example by one or several programmable processors, an application specific integrated circuit ASIC, a field programmable gate array FPGA, and/or a memory circuit.

Figure 6:
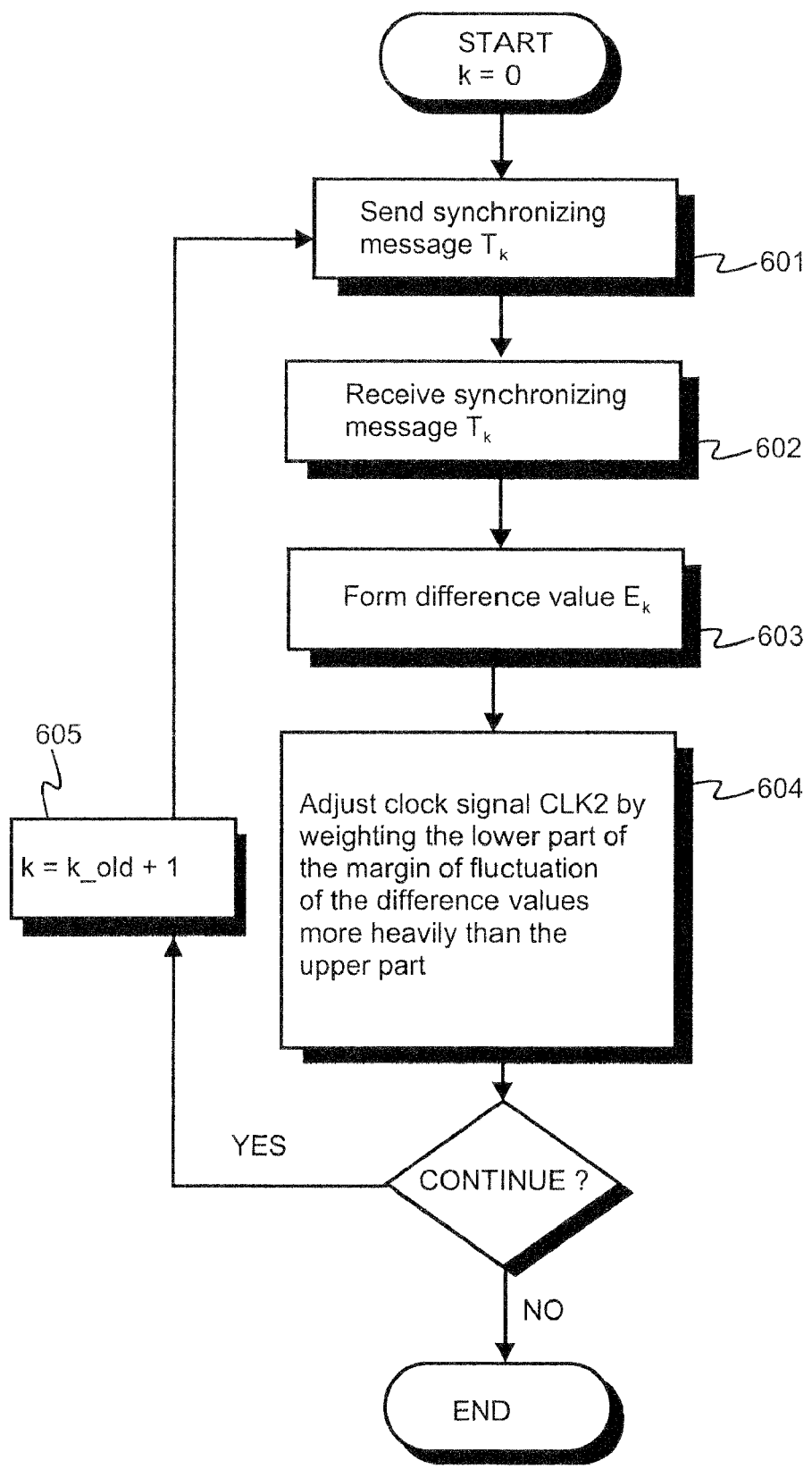
FIG. 6 is a flowchart illustrating a method according to an embodiment of the invention for mutually synchronizing a clock signal placed in a network element and a second clock signal placed in a second network element.

FIG. 6 is a flowchart illustrating a method according to a preferred embodiment of the invention for mutually synchronizing a first clock signal CLK1 placed in a first network element V1 and a second clock signal CLK2 placed in a second network element V2. In step 601, a synchronizing message $T_k$ is transmitted from a network element V1 to a network element V2. In step 602, the synchronizing message $T_k$ is received in the network element V2. In step 603, there is formed, for the synchronizing message $T_k$, a difference value $E_k$ that is essentially the difference of the reception time value and transmission value of the synchronizing message $T_k$. Said reception time value depends on the cumulated number of periods of the clock signal CLK2 at the moment of arrival of the synchronizing message $T_k$ at a predetermined synchronizing point in the network element V2, and said transmission value depends on the position of the synchronizing message $T_k$ in the chronological transmission order of the synchronizing messages. In step 604, the clock signal CLK2 is adjusted on the basis of the information contained by the difference value $E_k$ and at least one difference value corresponding to an earlier synchronizing message, so that in adjusting the clock signal CLK2, the adjusting effect of the difference values belonging to the first area of the margin of fluctuation of the difference values is weighted more heavily than the adjusting effect of the difference values belonging to the second area of the margin of fluctuation of the difference values. Said first and second area are selected so that the first area represents smaller difference values than the second area. In step 605, the index k describing the passage of time is increased, and step 601 is resumed.

In a method according to a preferred embodiment of the invention, a time stamp is written in the synchronizing message $T_k$ in the network element V1, said time stamp is read from the synchronizing message $T_k$ in the network element V2 and the time stamp is used as a transmission value connected to the synchronizing message $T_k$. The time stamp depends on the cumulated number of periods of the clock signal CLK1, which number of periods corresponds to the moment of departure of the synchronizing message $T_k$ from a predetermined synchronizing point in the network element V1.

In a method according to a preferred embodiment of the invention, a first synchronizing message is transmitted from the network element V1, the system waits for a preset number of the waiting periods of the clock signal CLK1, a second synchronizing message is transmitted from the network element V1, the calculator value is updated by a predetermined change value as a response to receiving said second synchronizing message in the network element V2, and said calculator value is used as the transmission value connected to said second synchronizing message.

In a method according to a preferred embodiment of the invention, the preset number of waiting periods is equal to the preset change value. Now the frequency of the clock signal CLK2 is attempted to be maintained the same as the frequency of the clock signal CLK1.

In a method according to a preferred embodiment of the invention, there is defined a limit value that is not surpassed by a predetermined share of difference values, and there is formed a weighted moving average of said difference values, where the weighting coefficients of difference values that fall below said limit value are larger than the weighting coefficients of difference values that surpass said limit value. The clock signal CLK2 is adjusted on the basis of said weighted moving average.

In a method according to a preferred embodiment of the invention, there is defined a limit value that is not surpassed by a predetermined share of difference values, and on the basis of said difference values, there is formed a low-pass filtered value, where the weighting coefficients of the difference values falling below said limit value are larger than the weighting coefficients of the difference values surpassing said limit value. The clock signal CLK2 is adjusted on the basis of said low-pass filtered value.

In a method according to a preferred embodiment of the invention, there is defined an estimate of the distribution of the difference values by classifying said difference values in value slots having predetermined low and high limits, and by forming for each value slot a frequency of occurrence indicator that is proportional to the number of the difference values belonging to said value slots. In this embodiment, there are defined those value slots that represent the lower part of the margin of fluctuation of the difference values, the sum of said frequency of occurrence indicators being a preset share of the sum of the frequency of occurrence indicators of all value slots. In this embodiment, from the estimate of the distribution of the difference values, there is calculated a weighted expected value, where the weighting coefficients of the frequency of occurrence indicators of the value slots representing the lower part of the margin of fluctuation of the difference values are larger than the weighting coefficients of the frequency of occurrence indicators of other value slots. The clock signal CLK2 is adjusted on the basis of said weighted expected value.

In a method according to a preferred embodiment of the invention, there is defined an estimate of the distribution of the difference values by classifying said difference values in value slots having predetermined low and high limits, and by forming for each value slot a frequency of occurrence indicator that is proportional to the number of the difference values belonging to said value slots. In this embodiment, a curve is fitted with the frequency of occurrence indicators of the value slots representing the lower part of the margin of fluctuation of the difference values. The clock signal CLK2 is adjusted on the basis of the difference value corresponding to the zero point of said curve.

A computer program according to a preferred embodiment of the invention for controlling a programmable processing unit in order to adjust a clock signal placed in a network element comprises programwise means for controlling said programmable processing unit to weight the adjusting effect of the difference values belonging to the first area of the margin of fluctuation of the difference values more heavily than the adjusting effect of the difference values belonging to the second area of the margin of fluctuation of the difference values. Said first area represents smaller difference values than said second area. Each difference value is essentially the difference of the reception time value and transmission value of the received synchronizing message. Said reception time value depends on the cumulated number of periods of said clock signal at the moment of arrival of said received synchronizing message at a predetermined synchronizing point in said network element, and said transmission value depends on the position of said received synchronizing message in the chronological transmission order of synchronizing messages.

Said program means can be for instance sub-programs or functions.

A computer program according to a preferred embodiment of the invention is recorded in a storage device readable by the processing unit, such as an optical CD disk.

A computer program according to an embodiment of the invention is coded in a signal that can be received in a data network such as the Internet.

For a man skilled in the art it is obvious that the invention and its various embodiments are not restricted to the above described embodiments only, but the invention and its embodiments can be varied within the scope of the independent claim.

What is claimed is:

1. A system for mutually synchronizing a first clock signal placed in a first network element and a second clock signal placed in a second network element, said first network element being arranged to transmit synchronizing messages to said second network element, and said second network element being arranged to receive said synchronizing messages, said system comprising:
calculation means that is arranged to form a difference value of a synchronizing message, said difference value being essentially a difference of a reception time value and a transmission value of the synchronizing message, said reception time value depending on a cumulated number of periods of the second clock signal at the moment of arrival of the synchronizing message at a predetermined synchronizing point in the second network element, and said transmission value depending on a position of said synchronizing message in a chronological transmission order of the synchronizing messages, and
adjusting means that is arranged to adjust the second clock signal in the basis of information contained by difference values corresponding to chronologically successive synchronizing messages,
wherein said adjusting means is arranged to weight an adjusting effect of the difference values belonging to a first area of a margin of fluctuation of the difference values more heavily than an adjusting effect of the difference values belonging to a second area of the margin of fluctuation of the difference values, said first area representing smaller difference values than said second area and said first area representing the lowest part of the margin of fluctuation of the difference values.

2. A system according to claim 1, wherein said first network element is arranged to write in said synchronizing message a time stamp that depends on a cumulated number of periods of the first clock signal, said cumulated number of periods corresponding to a moment of departure of said synchronizing message from a predetermined synchronizing point in said first network element, said second network element is arranged to read said time stamp from said synchronizing message, and said calculation means is arranged to use said time stamp as said transmission value.

3. A system according to claim 1, wherein said first network element is arranged to transmit a first synchronizing message, to wait for a first preset number of periods of the first clock signal and to transmit a second synchronizing message, said second network element is arranged to update a calculator value by a second predetermined number as a response to receiving the second synchronizing message, and said calculation means is arranged to use said calculator value as said transmission value.

4. A system according to claim 3, wherein said first preset number is equal to said second preset number.

5. A system according to claim 1, wherein said adjusting means is arranged to define a limit value that is not surpassed by a predetermined share of the difference values.

6. A system according to claim 5, wherein said adjusting means is arranged to form a weighted moving average of the difference values, where weighting coefficients of the difference values that fall below said limit value are larger than weighting coefficients of the difference values that surpass said limit value, and to adjust the second clock signal on the basis of said weighted moving average.

7. A system according to claim 5, wherein said adjusting means contain a low-pass filter that is arranged to form a low-pass filtered value of the difference values, where weighting coefficients of the difference values that fall below said limit value are larger than weighting coefficients of the difference values that surpass said limit value, and that said adjusting means is arranged to adjust the second clock signal on the basis of said low-pass filtered value.

8. A system according to claim 1, wherein said adjusting means is arranged to define an estimate of a distribution of the difference values by classifying the difference values in value slots that have predetermined low and high limits, and by forming for each value slot a frequency of occurrence indicator that is proportional to a number of the difference values belonging to said value slot.

9. A system according to claim 8, wherein said adjusting means is arranged to define the value slots representing a lower part of the margin of fluctuation of the difference values, a sum of the frequency of occurrence indicators of the value slots representing the lower part of the margin of fluctuation of the difference values being a preset share of a sum of the frequency of occurrence indicators of all the value slots, and to calculate from said estimate of the distribution of the difference values a weighted expected value, where weighting coefficients of the frequency of occurrence indicators of the value slots representing the lower part of the margin of fluctuation of the difference values are larger than weighting coefficients of the frequency of occurrence indicators of other value slots, and to adjust the second clock signal on the basis of said weighted expected value.

10. A system according to claim 8, wherein said adjusting means is arranged to fit a curve with the frequency of occurrence indicators of the value slots representing a lower part of the margin of fluctuation of the difference values and to adjust the second clock signal on the basis of the difference value corresponding to a zero point of said curve.

11. A network element that is arranged to receive synchronizing messages and comprises:
calculation means that is arranged to form a difference value of a received synchronizing message, said difference value being essentially a difference of a reception time value and a transmission value of said synchronizing message, said reception time value depending on a cumulated number of periods of a clock signal placed in said network element at a moment of arrival of said synchronizing message at a predetermined synchronizing point in said network element, and said transmission value depending on the position of said synchronizing message in a chronological transmission order of the synchronizing messages, and adjusting means that is arranged to adjust said clock signal on the basis of information contained by difference values corresponding to chronologically successive synchronizing messages, wherein said adjusting means is arranged to weight an adjusting effect of the difference values belonging to a first area of a margin of fluctuation of the difference values more heavily than an adjusting effect of the difference values belonging to a second area of the margin of fluctuation of the difference values, said first area representing smaller difference values than said second area and said first area representing the lowest part of the margin of fluctuation of the difference values.

12. A network element according to claim 11, wherein said network element is arranged to read a time stamp from said synchronizing message, and that said calculation means is arranged to use said time stamp as said transmission value.

13. A network element according to claim 11, wherein said network element is arranged to update a calculator value by a predetermined number as a response to receiving said synchronizing message, and said calculation means is arranged to use said calculator value as said transmission value.

14. A network element according to claim 11, wherein said adjusting means is arranged to define a limit value that is not surpassed by a predetermined share of the difference values.

15. A network element according to claim 14, wherein said adjusting means is arranged to form a weighted moving average of the difference values, where weighting coefficients of the difference values that fall below said limit value are larger than weighting coefficients of the difference values that surpass said limit value, and to adjust said clock signal on the basis of said weighted moving average.

16. A network element according to claim 14, wherein said adjusting means include a low-pass filter that is arranged to form a low-pass filtered value of the difference values, where weighting coefficients of the difference values that fall below said limit value are larger than weighting coefficients of the difference values that surpass said limit value, and that said adjusting means is arranged to adjust said clock signal on the basis of said low-pass filtered value.

17. A network element according to claim 11, wherein said adjusting means is arranged to define an estimate of the distribution of the difference values by classifying said difference values in time slots that have predetermined low and high limits, and by forming for each value slot a frequency of occurrence indicator that is proportional to a number of the difference values belonging to said value slot.

18. A network element according to claim 17, wherein said adjusting means is arranged to define the value slots representing a lower part of said margin of fluctuation of the difference values, where a sum of the frequency of occurrence indicators of said value slots representing the lower part of said margin of fluctuation of the difference values is a preset share of a sum of the frequency of occurrence indicators of all the value slots, and to calculate a weighted expected value of said estimate of the distribution of difference values, where weighting coefficients of the frequency of occurrence indicators of those value slots that represent the lower part of the margin of fluctuation of the difference values are larger than weighting coefficients of the frequency of occurrence indicators of other value slots, and to adjust said clock signal on the basis of said weighted expected value.

19. A network element according to claim 17, wherein said adjusting means is arranged to fit a curve with the frequency of occurrence indicators of the value slots representing a lower part of said margin of fluctuation of the difference values, and to adjust said clock signal on the basis of the difference value corresponding to a zero point of said curve.

20. A network element according to claim 11, wherein the network element is one of the following: IP (Internet Protocol) router and MPLS (Multi Protocol Label Switching) switch.

21. A network element according to claim 11, wherein the network element is an Ethernet switch.

22. A network element according to claim 11, wherein the network element is a mobile phone network base station.

23. A method for mutually synchronizing a first clock signal placed in a first network element and a second clock signal placed in a second network element, the method comprising:

transmitting synchronizing messages from the first network element to the second network element, receiving said synchronizing messages in said second network element, forming, for each synchronizing message, a difference value that is essentially a difference of a reception time value and a transmission value of said synchronizing message, said reception time value depending on a cumulated number of periods of the second clock signal placed in said second network element at a moment of arrival of said synchronizing message at a predetermined synchronizing point in said second network element, and said transmission value depending on a position of said synchronizing message in a chronological transmission order of the synchronizing messages, and adjusting said second clock signal on the basis of information contained by difference values corresponding to chronologically successive synchronizing messages, wherein, when adjusting said second clock signal, an adjusting effect of the difference values belonging to a first area of a margin of fluctuation of the difference values is weighted more heavily than an adjusting effect of the difference values belonging to a second area of the margin of fluctuation of the difference values, said first area representing smaller difference values than said second area and said first area representing the lowest part of the margin of fluctuation of the difference values.

24. A method according to claim 23, wherein a time stamp is written in said synchronizing message, said time stamp depending on a cumulated number of periods of the first clock signal, said cumulated number of periods corresponding to a moment of departure of said synchronizing message from a predetermined synchronizing point in the first network element, said time stamp is read from said synchronizing message, and the time stamp is used as said transmission value.

25. A method according to claim 23, wherein a first synchronizing message is transmitted from a first network element, the system waits for a first preset number of periods of the first clock signal, a second synchronizing message is transmitted from the first network element, a calculator value is updated by a second predetermined number as a response to receiving the second synchronizing message in a second network element, and said calculator value is used as the transmission value connected to said second synchronizing message.

26. A method according to claim 25, wherein said first preset number is equal to said second preset number.

27. A method according to claim 23, wherein there is defined a limit value that is not surpassed by a predetermined share of the difference values.

28. A method according to claim 27, wherein there is formed a weighted moving average of the difference values, where weighting coefficients of the difference values that fall below said limit value are larger than weighting coefficients of the difference values that surpass said limit value, and said second clock signal is adjusted on the basis of said weighted moving average.

29. A method according to claim 27, wherein there is formed a low-pass filtered value of the difference values, where weighting coefficients of the difference values that fall below said limit value are larger than weighting coefficients of the difference values that surpass said limit value, and that said second clock signal is adjusted on the basis of said low-pass filtered value.

30. A method according to claim 23, wherein there is defined an estimate of a distribution of the difference values by classifying the difference values in value slots with predetermined low and high limits, and by forming for each value slot a frequency of occurrence indicator that is proportional to a number of difference values belonging to said value slots.

31. A method according to claim 30, wherein there are determined value slots representing a lower part of the margin of fluctuation of the difference values, a sum of the frequency of occurrence indicators of the value slots representing the lower part of the margin of fluctuation of the difference values being a preset share of a sum of the frequency of occurrence indicators of all the value slots, and that from said estimate of the distribution of the difference values, there is calculated a weighted expected value, where weighting coefficients of the frequency of occurrence indicators of said value slots representing said lower part of the margin of fluctuation of the difference values are larger than weighting coefficients of the frequency of occurrence indicators of other value slots, and that the second clock signal is adjusted on the basis of said weighted expected value.

32. A method according to claim 30, wherein a curve is fitted with the frequency of occurrence indicators of the value slots representing a lower part of the margin of fluctuation of the difference values, and that said second clock signal is adjusted on the basis of the difference value corresponding to the zero point of said curve.

33. A storage device readable by a processing unit, the storage device storing a computer program for controlling the processing unit to adjust a clock signal placed in a network element on the basis of information contained by difference values corresponding to chronologically successive synchronizing messages, each of said difference values being essentially a difference of a reception time value and a transmission value of a received synchronizing message, said reception time value depending on a cumulated number of periods of said clock signal at the moment of arrival of said received synchronizing message at a predetermined synchronizing point in said network element, and said transmission value depending on a position of said received synchronizing message in a chronological transmission order of the synchronizing messages, wherein the computer program is provided with computer program means for controlling said processing unit to weight an adjusting effect of the difference values belonging to a first area of a margin of fluctuation of the difference values more heavily than an adjusting effect of the difference values belonging to the second area of the margin of fluctuation of the difference values, said first area representing smaller difference values than said second area and said first area representing the lowest part of the margin of fluctuation of the difference values.

* * * * *